(12) United States Patent
Chen

(10) Patent No.: US 10,939,160 B2
(45) Date of Patent: Mar. 2, 2021

(54) FAST CHANGE METHOD FOR DVB CHANNEL, DEVICE, AND SYSTEM

(71) Applicant: Huawei Technologies Co., Ltd., Shenzhen (CN)

(72) Inventor: Shengping Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 126 days.

(21) Appl. No.: 16/185,814

(22) Filed: Nov. 9, 2018

(65) Prior Publication Data
US 2019/0082216 A1 Mar. 14, 2019

Related U.S. Application Data

(63) Continuation of application No. PCT/CN2017/075890, filed on Mar. 7, 2017.

(30) Foreign Application Priority Data

Aug. 3, 2016 (CN) .......................... 201610630744.0

(51) Int. Cl.
H04N 21/438 (2011.01)
H04N 21/845 (2011.01)
(Continued)

(52) U.S. Cl.
CPC ....... *H04N 21/4383* (2013.01); *H04N 21/222* (2013.01); *H04N 21/266* (2013.01);
(Continued)

(58) Field of Classification Search
CPC .... H04N 21/222; H04N 21/266; H04N 21/43; H04N 21/4302; H04N 21/437;
(Continued)

(56) References Cited

U.S. PATENT DOCUMENTS 6,100,667 A 8/2000 Mercer et al.
9,032,433 B2 5/2015 Kaftan
(Continued)

FOREIGN PATENT DOCUMENTS

CN 101753973 A 6/2010
CN 101854533 A 10/2010
(Continued)

OTHER PUBLICATIONS

Machine Translation and Abstract of Chinese Publication No. CN103347207, Oct. 9, 2013, 11 pages.
(Continued)

*Primary Examiner* — Rong Le
(74) *Attorney, Agent, or Firm* — Conley Rose, P.C.

(57) ABSTRACT

A fast change method for a digital video broadcasting (DVB) channel. A fast channel change (FCC) server is introduced into an existing DVB system architecture, and a unicast transport stream is fast sent to a user equipment in a manner of unicast of the FCC server assisting broadcast. A transport stream (TS) stream and a Real-time Transport Protocol (RTP) stream are synchronized by comparing presentation time stamp (PTS) values of TS streams on a DVB side and an FCC side. In this way, it is ensured that the user equipment fast displays an image, channel change time is reduced, a channel change speed is increased, and user experience is improved.

20 Claims, 10 Drawing Sheets

(51) Int. Cl.
*H04N 21/43* (2011.01)
*H04N 21/6408* (2011.01)
*H04N 21/437* (2011.01)
*H04N 21/266* (2011.01)
*H04N 21/222* (2011.01)

(52) U.S. Cl.
CPC ......... *H04N 21/43* (2013.01); *H04N 21/4302* (2013.01); *H04N 21/437* (2013.01); *H04N 21/438* (2013.01); *H04N 21/4384* (2013.01); *H04N 21/6408* (2013.01); *H04N 21/8456* (2013.01)

(58) Field of Classification Search
CPC ............. H04N 21/438; H04N 21/4383; H04N 21/4384; H04N 21/6408; H04N 21/8456
See application file for complete search history.

(56) References Cited

U.S. PATENT DOCUMENTS

| | | | |
|---|---|---|---|
| 2005/0190781 A1* | 9/2005 | Green | H04N 21/4263 370/432 |
| 2007/0204312 A1* | 8/2007 | Wheelock | H04N 21/23424 725/94 |
| 2009/0327215 A1* | 12/2009 | Zhu | H04N 21/6437 |
| 2010/0043022 A1 | 2/2010 | Kaftan | |
| 2011/0258674 A1 | 10/2011 | Yang et al. | |
| 2012/0269075 A1* | 10/2012 | Fernandes | H04N 21/8547 370/252 |
| 2012/0304236 A1 | 11/2012 | Qiu et al. | |
| 2015/0215661 A1* | 7/2015 | Wang | H04N 21/4825 725/109 |
| 2017/0272691 A1* | 9/2017 | Song | H04N 21/4363 |

FOREIGN PATENT DOCUMENTS

| | | |
|---|---|---|
| CN | 103347207 A | 10/2013 |
| CN | 104202676 A | 12/2014 |
| CN | 104426875 A | 3/2015 |
| CN | 105376613 A | 3/2016 |
| CN | 106454394 A | 2/2017 |
| EP | 2071850 A1 | 6/2009 |
| EP | 3373588 A1 | 9/2018 |

OTHER PUBLICATIONS

Machine Translation and Abstract of Chinese Publication No. CN104202676, Dec. 10, 2014, 19 pages.
Machine Translation and Abstract of Chinese Publication No. CN104426875, Mar. 18, 2015, 10 pages.
DVB Organization "IPI2738 Specification for Fast Channel Change extensions to DVB-IP.doc," XP017810860, Technical Specification, May 19, 2009, 24 pages.
Foreign Communication From A Counterpart Application, Chinese Application No. 201610630744.0, Chinese Office Action dated Nov. 12, 2018, 7 pages.
Foreign Communication From A Counterpart Application, Chinese Application No. 201610630744.0, Chinese Search Report dated Oct. 31, 2018, 3 pages.
Foreign Communication From A Counterpart Application, European Application No. 17836160.6, Extended European Search Report dated Nov. 23, 2018, 8 pages.
Machine Translation and Abstract of Chinese Publication No. CN105376613, Mar. 2, 2016, 21 pages.
Machine Translation and Abstract of Chinese Publication No. CN106454394, Feb. 22, 2017, 30 pages.
Foreign Communication From A Counterpart Application, PCT Application No. PCT/CN2017/075890, English Translation of International Search Report dated May 25, 2017, 2 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       Sequence number         |
+-+-+-+-+-+-+-+-+-+-+-+-+-+-+-+-+-+-+-+-+-+-+-+-+-+-+-+-+-+-+-+-+
|                           Timestamp                           |
+-+-+-+-+-+-+-+-+-+-+-+-+-+-+-+-+-+-+-+-+-+-+-+-+-+-+-+-+-+-+-+-+
|               Synchronization source (SSRC) identifier        |
+=+=+=+=+=+=+=+=+=+=+=+=+=+=+=+=+=+=+=+=+=+=+=+=+=+=+=+=+=+=+=+=+
|                Contributing source (CSRC) indentifiers        |
+-+-+-+-+-+-+-+-+-+-+-+-+-+-+-+-+-+-+-+-+-+-+-+-+-+-+-+-+-+-+-+-+
```

FIG. 8

| TAG=1000(PTS range) | Length=20 |
|---|---|
| PTS1-low | |
| PTS1-high | |
| PTS2-low | |
| PTS2-high | |

FIG. 9

| 4 | 15 | 1 | 15 | 1 | 15 | 1 |
|---|---|---|---|---|---|---|
| Inner_flag | PTS[32..30] | Market_bit | PTS[29..15] | Market_bit | PTS[14..0] | Market_bit |

FIG. 10

FAST CHANGE METHOD FOR DVB CHANNEL, DEVICE, AND SYSTEM

CROSS-REFERENCE TO RELATED APPLICATIONS

This application is a continuation of International Patent Application No. PCT/CN2017/075890 filed on Mar. 7, 2017, which claims priority to Chinese Patent Application No. 201610630744.0 filed on Aug. 3, 2016. The disclosure of the aforementioned applications are hereby incorporated by reference in their entireties.

TECHNICAL FIELD

The present disclosure relates to the field of media technologies, and in particular, to a Digital Video Broadcasting (DVB) system-based fast change method for a DVB channel, user equipment, and a DVB system.

BACKGROUND

DVB is a suite of internationally accepted open standards for digital television that are maintained by the DVB Project. The DVB Project is an industry consortium with more than 300 members, and is launched by a Joint Technical Committee (JTC) including the European Telecommunications Standards Institute (ETSI), the European Committee for Electrotechnical Standardization (CENELEC), and the European Broadcasting Union (EBU). An objective of DVB is to design a universal digital television system. Conversion between various transmission modes in the system is performed in a simplest manner in order to increase universality as much as possible. The DVB standards provide a set of complete digital television system specifications applicable to different media. A DVB digital broadcasting transmission system uses all universal television broadcasting transmission media including satellites, cables, terrestrials, Satellite Master Antenna TeleVision (SMATV), and Microwave Multipoint Distribution Systems (MMDS). DVB standards respectively corresponding to the satellites, cables, terrestrials, SMATV, and MNDSD are DVB-S, DVB-C, DVB-T, DVB-SMATV, DVB-MS, and DVB-MC.

With development and application of video technologies, compared with the past in which only an indicator of quality of service (QoS) is concerned, Quality of Experience (QoE) is more widely applied and approved. QoE is used to rate the performance of a device or a network from the perspective of common user experience, rather than using various professional indicators such as a delay, a packet loss rate, and a jitter that are commonly used in the industry. With desirable result intuition and ease of being understood by non-professionals, various indicators of QoE are widely approved and applied. Channel change time is an important indicator in QoE. However, currently, DVB channel change time relies on frequency search and locking of a target channel, and the frequency search and locking take a relatively long period of time, usually longer than two seconds, causing a relatively low channel change speed and poor user experience.

SUMMARY

In view of this, it is necessary to provide a fast change method for a DVB channel, a device, and a system, to reduce wait time of channel change for user equipment, and increase a channel change speed.

According to a first aspect, a fast change method for a DVB channel is provided, applied to a user equipment side, and including receiving a channel change request initiated by a user, where the channel change request includes a target channel identifier, determining a frequency of a target channel based on the target channel identifier, sending a unicast request to a fast channel change (FCC) server based on the channel change request, wherein the unicast request includes the target channel identifier, receiving a unicast transport stream that is of the target channel and that is sent by the FCC server, receiving, based on the frequency of the target channel, a broadcast transport stream that is of the target channel and that is sent by a DVB network side, and when determining that the broadcast transport stream is synchronous with the unicast transport stream, sending a synchronization notification to the FCC server to instruct the FCC server to stop sending the unicast transport stream of the target channel.

In the fast change method for a DVB channel in this embodiment of the present disclosure, the FCC server is introduced into an existing DVB system architecture, and the unicast transport stream is fast sent to a user equipment in a manner of unicast of the FCC server assisting broadcast. In this way, it is ensured that the user equipment fast displays an image, channel change time is reduced, a channel change speed is increased, and user experience is improved.

In a possible implementation, the user equipment further parses the broadcast transport stream that is of the target channel and that is received from the DVB network side, and determines a presentation time stamp PTS value of each TS packet in the broadcast transport stream for subsequent synchronization determining.

In a possible implementation, the user equipment further parses unicast Real-time Transport Protocol (RTP) packets received from the FCC server, and obtains a presentation time stamp (PTS) range value of a transport stream (TS) packet carried in each of the RTP packets for subsequent synchronization determining.

In a possible implementation, the user equipment determines, based on an obtained PTS value of a unicast TS packet and an obtained PTS value of a broadcast TS packet, whether a PTS value of a currently received TS packet in the broadcast transport stream falls within a PTS range value of a currently received RTP packet in the unicast transport stream, and if a determining result is yes, determines that the broadcast transport stream is synchronous with the unicast transport stream.

In a possible implementation, the synchronization notification carries a PTS value of the first TS packet in the broadcast transport stream received by the user equipment, and the PTS value is used by an FCC server for synchronization determining.

In this implementation, the user equipment separately parses the broadcast TS packet and the unicast TS packet, and obtains a PTS value of each TS packet for synchronization determining such that accuracy of the synchronization determining can be ensured, seamless change of a user equipment to the broadcast transport stream can be ensured, a video jitter can be avoided, and user experience can be further improved.

According to a second aspect, an embodiment of the present disclosure provides a fast change method for a DVB channel, including receiving a unicast request sent by user equipment, where the unicast request includes a target channel identifier, sending a unicast transport stream of the target channel to the user equipment based on the target channel identifier, sending a broadcast transport stream of the target channel to the user equipment, receiving a synchronization notification sent by the user equipment, and when determining, based on the synchronization notification, that the broadcast transport stream is synchronous with the unicast transport stream, stopping sending the unicast transport stream of the target channel to the user equipment.

In a possible implementation, the FCC server obtains a PTS value of a to-be-sent TS packet in the unicast transport stream, compares whether the PTS value of the to-be-sent TS packet is the same as the PTS value of the first TS packet in the broadcast transport stream, and if a comparison result is yes, determines that the broadcast transport stream is synchronous with the unicast transport stream.

In this implementation, the FCC server determines, based on the PTS value that is of the first TS packet and that is reported by a user equipment and the PTS value of the local to-be-sent TS packet, whether the broadcast transport stream is synchronous with the unicast transport stream. The determining manner is simple, the result is accurate, unnecessary unicast stream transmission is reduced, and use performance of a device is improved.

According to a third aspect, user equipment is provided, including a communications interface configured to receive a channel change request initiated by a user, wherein the channel change request includes a target channel identifier, and a processor configured to determine a frequency of a target channel based on the target channel identifier, wherein the communications interface is further configured to send a unicast request to an FCC server based on the channel change request, where the unicast request includes the target channel identifier, the communications interface is further configured to receive a unicast transport stream that is of the target channel and that is sent by the FCC server, and receive, based on the frequency of the target channel, a broadcast transport stream that is of the target channel and that is sent by a DVB network side, and the communications interface is further configured to when the processor determines that the broadcast transport stream is synchronous with the unicast transport stream, send a synchronization notification to the FCC server to instruct the FCC server to stop sending the unicast transport stream of the target channel.

In a possible implementation, the processor is further configured to parse the received broadcast transport stream of the target channel, and determine a presentation time stamp PTS value of each transport stream TS packet in the broadcast transport stream.

In a possible implementation, the unicast transport stream is RTP packets, and the processor is further configured to parse RTP packets in the unicast transport stream, and obtain a PTS range value of a TS packet carried in each of the RTP packets.

In a possible implementation, the processor is further configured to determine whether a PTS value of a currently received TS packet in the broadcast transport stream falls within a PTS range value of a currently received RTP packet in the unicast transport stream, and if a determining result is yes, determine that the broadcast transport stream is synchronous with the unicast transport stream.

According to a fourth aspect, another user equipment is provided, including a transceiver unit configured to receive a channel change request initiated by a user, where the channel change request includes a target channel identifier, a DVB control unit configured to determine a frequency of a target channel based on the target channel identifier, lock the frequency, and control the transceiver unit to receive a broadcast transport stream of the target channel from a DVB network side, an FCC control unit configured to send a unicast request to an FCC server based on the channel change request, where the unicast request includes the target channel identifier, and control the transceiver unit to receive a unicast transport stream that is of the target channel and that is sent by the FCC server, and a determining unit configured to, when the broadcast transport stream is synchronous with the unicast transport stream, control the transceiver unit to send a synchronization notification to the FCC server to instruct the FCC server to stop sending the unicast transport stream of the target channel.

In a possible implementation, the user equipment further includes a PTS parsing unit configured to parse the received broadcast transport stream of the target channel, and determine a presentation time stamp PTS value of each TS packet in the broadcast transport stream.

In a possible implementation, the unicast transport stream is RTP packets, and the user equipment further includes an RTP parsing unit configured to parse RTP packets in the unicast transport stream, and obtain a PTS range value of a TS packet carried in each of the RTP packets.

In a possible implementation, the user equipment further includes the determining unit configured to determine whether a PTS value of a currently received TS packet in the broadcast transport stream falls within a PTS range value of a currently received RTP packet in the unicast transport stream, and if a determining result is yes, determine that the broadcast transport stream is synchronous with the unicast transport stream.

According to a fifth aspect, a DVB system is provided, including a live encoder configured to receive a program signal of a target channel from a program source, encode the program signal, and output a transport stream of the target channel, a media relay function system, connected to the live encoder, and configured to receive the transport stream that is of the target channel and that is output from the live encoder, encapsulate the transport stream into RTP packets, and forward the RTP packets to an FCC server, the FCC server, connected to the media relay function system configured to receive the RTP packets forwarded by the media relay function system, further configured to receive a unicast request sent by user equipment, where the unicast request includes a target channel identifier, and send a unicast transport stream of the target channel to the user equipment based on the target channel identifier, and further configured to receive a synchronization notification sent by the user equipment, and when determining, based on the synchronization notification, that a broadcast transport stream is synchronous with the unicast transport stream, stop sending the unicast transport stream of the target channel to the user equipment, and a modulation and multiplex device, connected to the live encoder, and configured to receive the transport stream of the target channel from the live encoder, and multiplex and modulate the transport stream, and send the transport stream on which the multiplexing and modulation have been performed to the user equipment in a broadcast manner.

According to a sixth aspect, an FCC server is provided, including a communications interface and a processor. The communications interface is configured to receive a unicast request sent by user equipment, where the unicast request includes a target channel identifier, and is further configured to send a unicast transport stream of the target channel to the user equipment based on the target channel identifier. Further, the communications interface is configured to receive a synchronization notification sent by the user equipment. The processor is configured to determine, based on the synchronization notification, whether a broadcast transport stream is synchronous with the unicast transport stream, and if determining that the broadcast transport stream is synchronous with the unicast transport stream, control the communications interface to stop sending the unicast transport stream of the target channel to the user equipment.

According to a seventh aspect, an embodiment of the present disclosure provides an FCC server, including a transceiver unit configured to receive RTP packets forwarded by a media relay function system, and further configured to receive a unicast request sent by user equipment, where the unicast request includes a target channel identifier, an FCC control unit configured to control, based on the unicast request of the user equipment, the transceiver unit to send a unicast transport stream that is of the target channel and that starts from an I frame to the user equipment, and a determining unit configured to, after the transceiver unit receives a synchronization notification sent by the user equipment, and when determining, based on the synchronization notification, that a broadcast transport stream is synchronous with the unicast transport stream, control the transceiver unit to stop sending the unicast transport stream of the target channel to the user equipment.

According to an eighth aspect, an embodiment of the present disclosure provides a computer storage medium configured to store a computer software instruction used by the foregoing user equipment. The computer software instruction includes a program designed to perform the foregoing methods.

According to a ninth aspect, an embodiment of the present disclosure provides a computer storage medium configured to store a computer software instruction used by the foregoing FCC server. The computer software instruction includes a program designed to perform the foregoing methods.

In the fast change method for a DVB channel in the embodiments of the present disclosure, the FCC server is introduced into the existing DVB system architecture, and the unicast transport stream is fast sent to a user equipment in the manner of unicast of the FCC server assisting broadcast. In this way, it is ensured that the user equipment fast displays an image, channel change time is reduced, a channel change speed is increased, and user experience is improved.

BRIEF DESCRIPTION OF DRAWINGS

FIG. 8 is a schematic diagram of a data structure of a header of an RTP packet;

FIG. 9 is a schematic diagram of a data structure of an extension header of an RTP packet; and FIG. 10 is a schematic diagram of a PTS data structure.

DESCRIPTION OF EMBODIMENTS

The following further describes the technical solutions in the embodiments of the present disclosure with reference to the accompanying drawings in the embodiments of the present disclosure.

Figure 1:
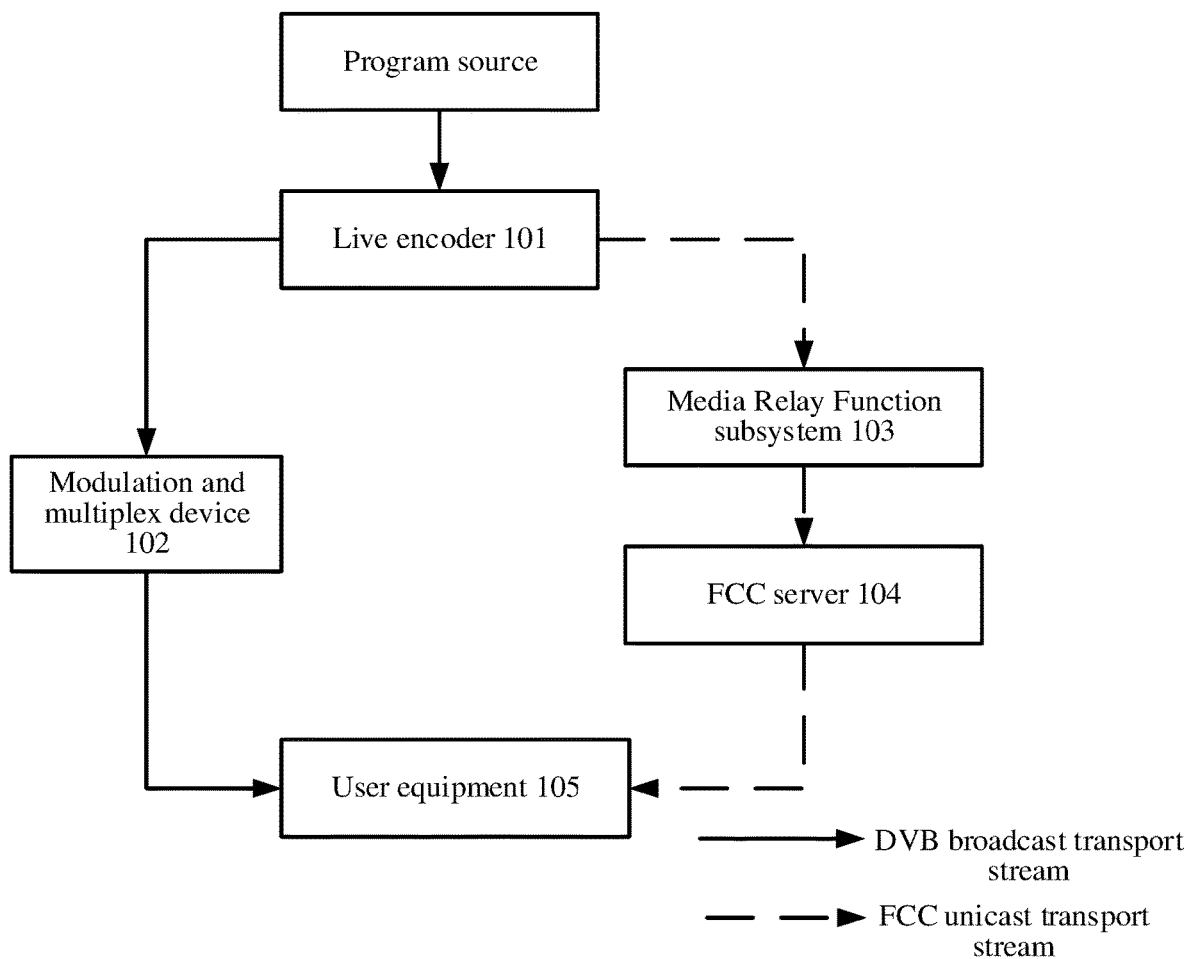
FIG. 1 is a diagram of a DVB network architecture according to an embodiment of the present disclosure.

FIG. 1 is a diagram of a DVB network architecture according to an embodiment of the present disclosure.

As shown in FIG. 1, in this embodiment of the present disclosure, to resolve a problem of fast change of a DVB channel, a media relay function (MRF) system 103 and an FCC server 104 are newly added to an existing DVB network architecture. The MRF system 103 is mainly configured to perform RTP protocol encapsulation, Delay Factor (DF) value stabilizing, forward error correction (FEC) encoding, and the like on a TS stream, and provide a reliable RTP stream to the FCC server. The FCC server 104 is configured to reduce a channel change speed in a unicast assisting broadcast manner. The FCC server 104 caches the RTP stream received from the MRF system 103, and after receiving an FCC service request of user equipment, directly pushes a unicast transport stream starting from an I frame to the user equipment such that fast image displaying by the user equipment is ensured, and channel change time is reduced. In addition to the foregoing two newly added systems, the DVB system further includes a live encoder 101, a modulation and multiplex device 102, and user equipment 105.

The live encoder 101 is configured to receive a live signal of a program from a program source (a satellite or a wired signal), and convert the live signal of the program into an Internet protocol (IP)-protocol media stream (for example, a TS stream) such that the live signal of the program can be transmitted through an IP network.

The modulation and multiplex device 102 is configured to obtain the TS stream of the program from the live encoder 101, perform multiplex processing, channel encoding, and modulation on the TS stream, and broadcast the TS stream on which the multiplex processing, channel encoding, and modulation have been performed to the user equipment 104.

Further, the modulation and multiplex device 102 includes a quadrature amplitude modulation (QAM) modulator and a multiplexer (MUX). The MUX is mainly configured to multiplex and transmit a multi-channel television program. The QAM modulator is used as a front-end device of the DVB system, receives a TS stream from a device such as an encoder or a multiplexer, performs RS coding (i.e., Reed-Solomon codes) coding, convolutional coding, and QAM digital modulation on the TS stream, and outputs a radio frequency signal. The radio frequency signal can be directly transmitted to the user equipment through a cable television network.

The user equipment 105 is configured to receive the broadcast TS stream of the channel from the modulation and multiplex device 102 for decoding and playing. Further, the user equipment 105 may be a set-top box or another user equipment supporting DVB-related standards, for example, a device such as a smartphone or a tablet computer. Particularly, in this embodiment of the present disclosure, the set-top box needs to have a DVB-and-IP dual-mode function, and can both receive the broadcast TS stream of the channel from the modulation and multiplex device and receive a unicast RTP stream from the FCC server.

It should be noted that the foregoing descriptions merely list some network devices and functional entities in the DVB network architecture in the solution of the present disclosure as an example. In an actual networking architecture, the DVB network may further include another network functional entity complying with DVB-series specifications.

Figure 2:
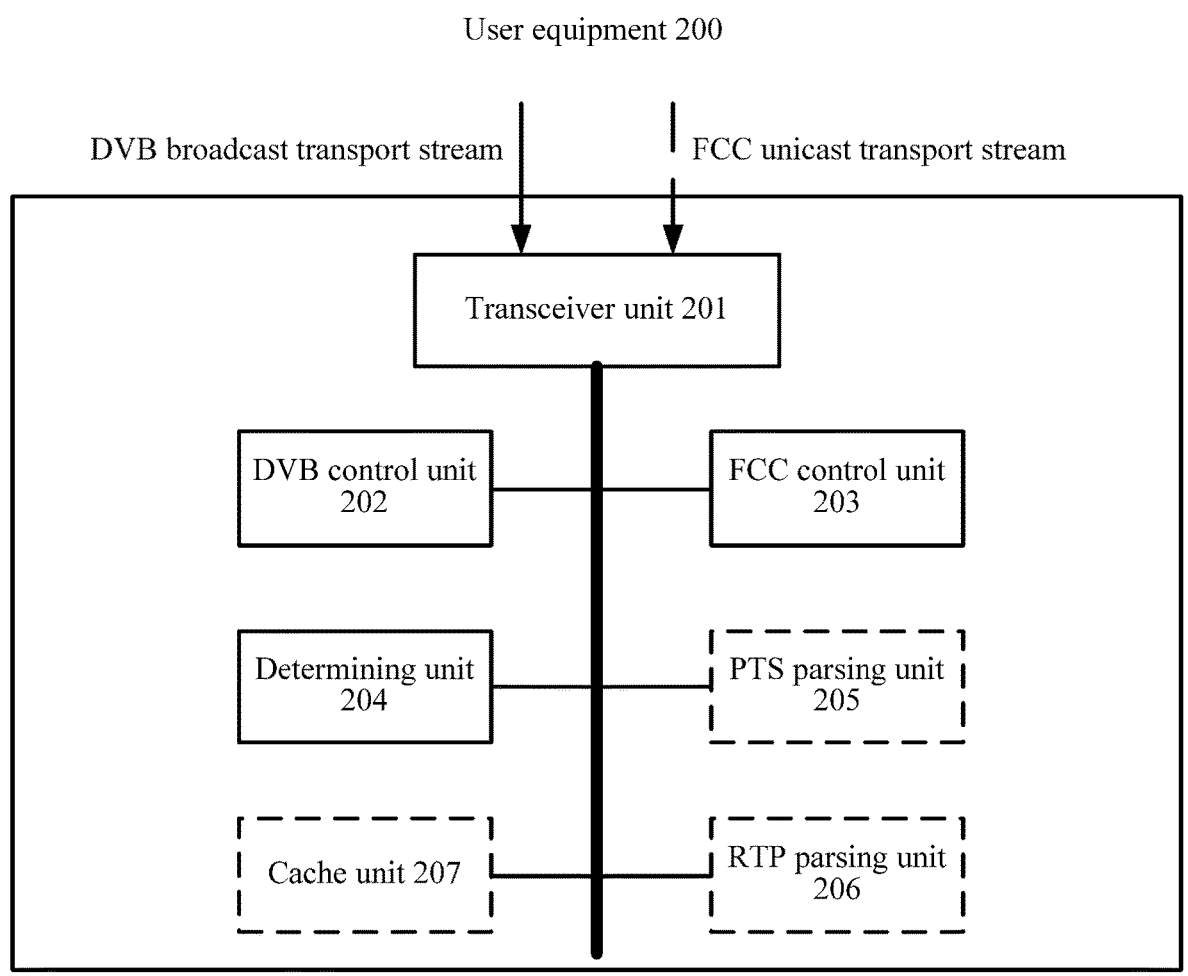
FIG. 2 is a schematic structural diagram of user equipment according to an embodiment of the present disclosure.

The user equipment in the embodiments of the present disclosure is further described below. FIG. 2 is a schematic structural diagram of user equipment according to an embodiment of the present disclosure. As shown in FIG. 2, the user equipment 200 in this embodiment of the present disclosure includes a transceiver unit 201 configured to receive a channel change request initiated by a user, where the channel change request includes a target channel identifier, a DVB control unit 202 configured to determine a frequency of a target channel based on the target channel identifier, lock the frequency, and control the transceiver unit 201 to receive a broadcast transport stream of the target channel from a DVB system, an FCC control unit 203 configured to send a unicast request to an FCC server based on the channel change request, where the unicast request includes the target channel identifier, and control the transceiver unit 201 to receive a unicast transport stream that is of the target channel and that is sent by the FCC server, and a determining unit 204 configured to, when the broadcast transport stream is synchronous with the unicast transport stream, control the transceiver unit 201 to send a synchronization notification to the FCC server to instruct the FCC server to stop sending the unicast transport stream of the target channel.

Optionally, the user equipment 200 further includes a PTS parsing unit 205 configured to parse the received broadcast transport stream of the target channel, and determine a presentation time stamp PTS value of each TS packet in the broadcast transport stream.

Optionally, the user equipment 200 further includes an RTP parsing unit 206 configured to parse RTP packets received from the FCC server, and obtain a PTS range value of a TS packet carried in each of the RTP packets.

Optionally, the determining unit 204 may be configured to determine, based on the PTS value that is of the TS packet in the broadcast transport stream and that is obtained by the PTS parsing unit 205 and the PTS range value that is of the TS packet in the unicast transport stream and that is obtained by the RTP parsing unit 206, whether a PTS value of a currently received TS packet in the broadcast transport stream falls within a PTS range value of a currently received RTP packet in the unicast transport stream, and if a determining result is yes, determine that the broadcast transport stream is synchronous with the unicast transport stream.

Optionally, the user equipment 200 may further include a cache unit 207 configured to cache the broadcast transport stream that is of the target channel and that is received from the DVB system, and cache the PTS value of each TS packet in the broadcast transport stream.

It should be noted that the function modules of the user equipment 200 may be implemented by hardware, or may be implemented by a software function module, or may be implemented by a software function module in combination with hardware.

Another user equipment in the embodiments of the present disclosure is further described below with reference to FIG. 3.

Figure 3:
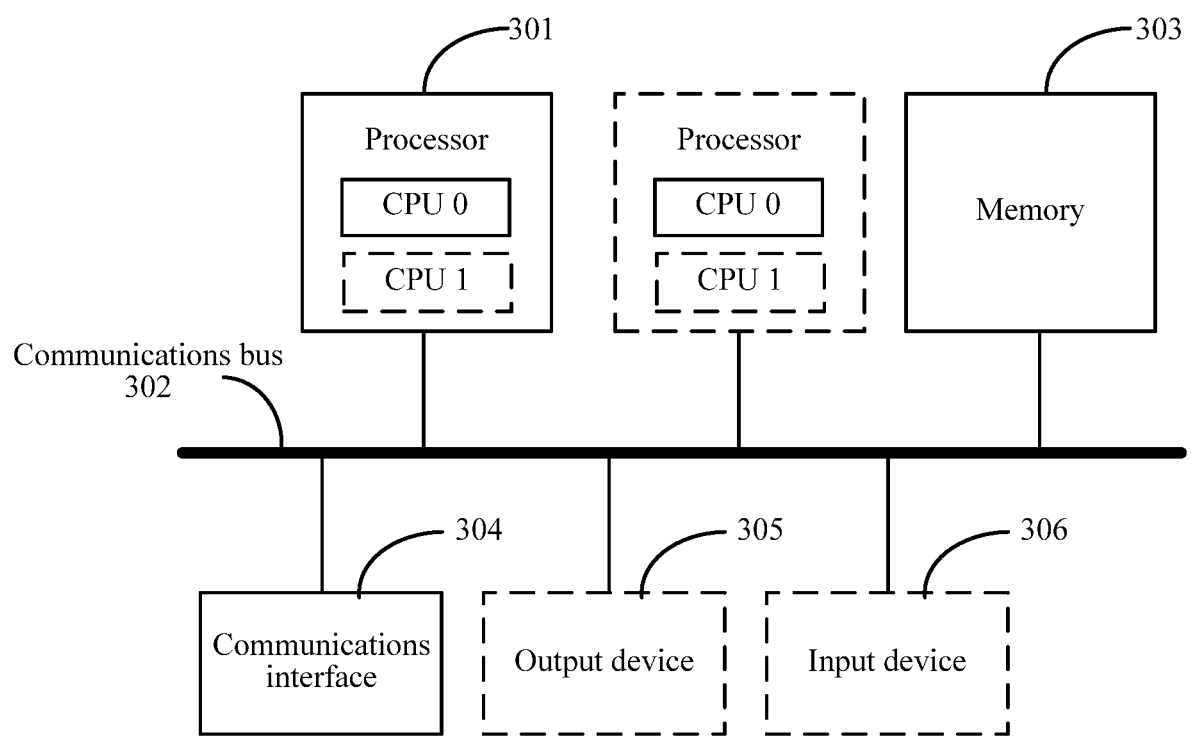
FIG. 3 is a schematic structural diagram of another user equipment according to an embodiment of the present disclosure.

FIG. 3 is a schematic structural diagram of another user equipment according to an embodiment of the present disclosure. As shown in FIG. 3, the user equipment includes at least one processor 301, a communications bus 302, a memory 303, and at least one communications interface 304.

The processor 301 may be a general central processing unit (CPU), a microprocessor, an application-specific integrated circuit (ASIC), or one or more integrated circuits configured to control program execution in the solution of the present disclosure.

The communications bus 302 may include a path used to transmit information between the foregoing components. The communications interface 304 is applicable to any transceiver-type apparatus, and is configured to communicate with another device or a communications network such as Ethernet, a radio access network (RAN), or a wireless local area network (WLAN).

The memory 303 may be a read-only memory (ROM) or another type of static storage device that can store static information and a static instruction, or a random access memory (RAM) or another type of dynamic storage device that can store information and an instruction, or may be an electrically erasable programmable ROM (EEPROM), a compact disc ROM (CD-ROM) or another compact disc storage medium, optical disc storage medium (including a compact disc, a laser disc, an optical disc, a digital versatile disc, a BLU-RAY DISC, or the like) and magnetic disk storage medium, another magnetic storage device, or any other medium that can be configured to carry or store expected program code in a form of an instruction or a data structure and that is accessible to a computer, but is not limited thereto. The memory may independently exist and may be connected to the processor using the communications bus. Alternatively, the memory 303 may be integrated with the processor 301.

The memory 303 is configured to store application program code for performing the solution of the present disclosure, and the performing is controlled by the processor 301. The processor 301 is configured to execute the application program code stored in the memory 303.

During specific implementation, in an embodiment, the processor 301 may include one or more CPUs, for example, a CPU 0 and a CPU 1 in FIG. 3.

During specific implementation, in an embodiment, the user equipment may include a plurality of processors, for example, a processor 301 and another processor in FIG. 3. Each of the processors may be a single-core processor or a multi-core processor. The processor herein may refer to one or more devices, circuits, and/or processing cores configured to process data (such as a computer program instruction).

During specific implementation, in an embodiment, the user equipment may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, a projector, or the like. The input device 306 communicates with the processor 301, and may receive an input by a user in a plurality of manners. For example, the input device 306 may be a mouse, a keyboard, a touchscreen device, a sensing device, or the like.

The user equipment may be a general-purpose computer device or a special-purpose computer device. During specific implementation, the user equipment may be a desktop computer, a portable computer, a network server, a personal digital assistant (PDA), a set-top box, a smart television, a mobile phone, a tablet computer, a wireless terminal device, a communications device, an embedded device, or a device having a structure similar to that in FIG. 3. A type of the user equipment is not limited in this embodiment of the present disclosure.

In a fast change method for a DVB channel in the embodiments of the present disclosure, specific operation division of the components of the user equipment is as follows.

The communications interface 304 is configured to receive a channel change request initiated by a user, where the channel change request includes a target channel identifier.

The processor 301 is configured to determine a frequency of a target channel based on the target channel identifier.

The communications interface 304 is further configured to send a unicast request to an FCC server based on the channel change request, where the unicast request includes the target channel identifier.

The communications interface 304 is further configured to receive a unicast transport stream that is of the target channel and that is sent by the FCC server, and receive, based on the frequency of the target channel, a broadcast transport stream that is of the target channel and that is sent by a DVB system.

The communications interface 304 is further configured to, when the processor 301 determines that the broadcast transport stream is synchronous with the unicast transport stream, send a synchronization notification to the FCC server to instruct the FCC server to stop sending the unicast transport stream of the target channel.

The processor 301 is further configured to parse the received broadcast transport stream of the target channel, and determine a PTS value of each transport stream TS packet in the broadcast transport stream.

The processor 301 is further configured to parse RTP packets in the unicast transport stream, and obtain a PTS range value of a TS packet carried in each of the RTP packets. The processor 301 is further configured to determine whether a PTS value of a currently received TS packet in the broadcast transport stream falls within a PTS range value of a currently received RTP packet in the unicast transport stream, and if a determining result is yes, determine that the broadcast transport stream is synchronous with the unicast transport stream.

It should be noted that a specific implementation of the user equipment in the fast change method for a DVB channel in the embodiments of the present disclosure is further described below with reference to method embodiments.

Figure 4A:
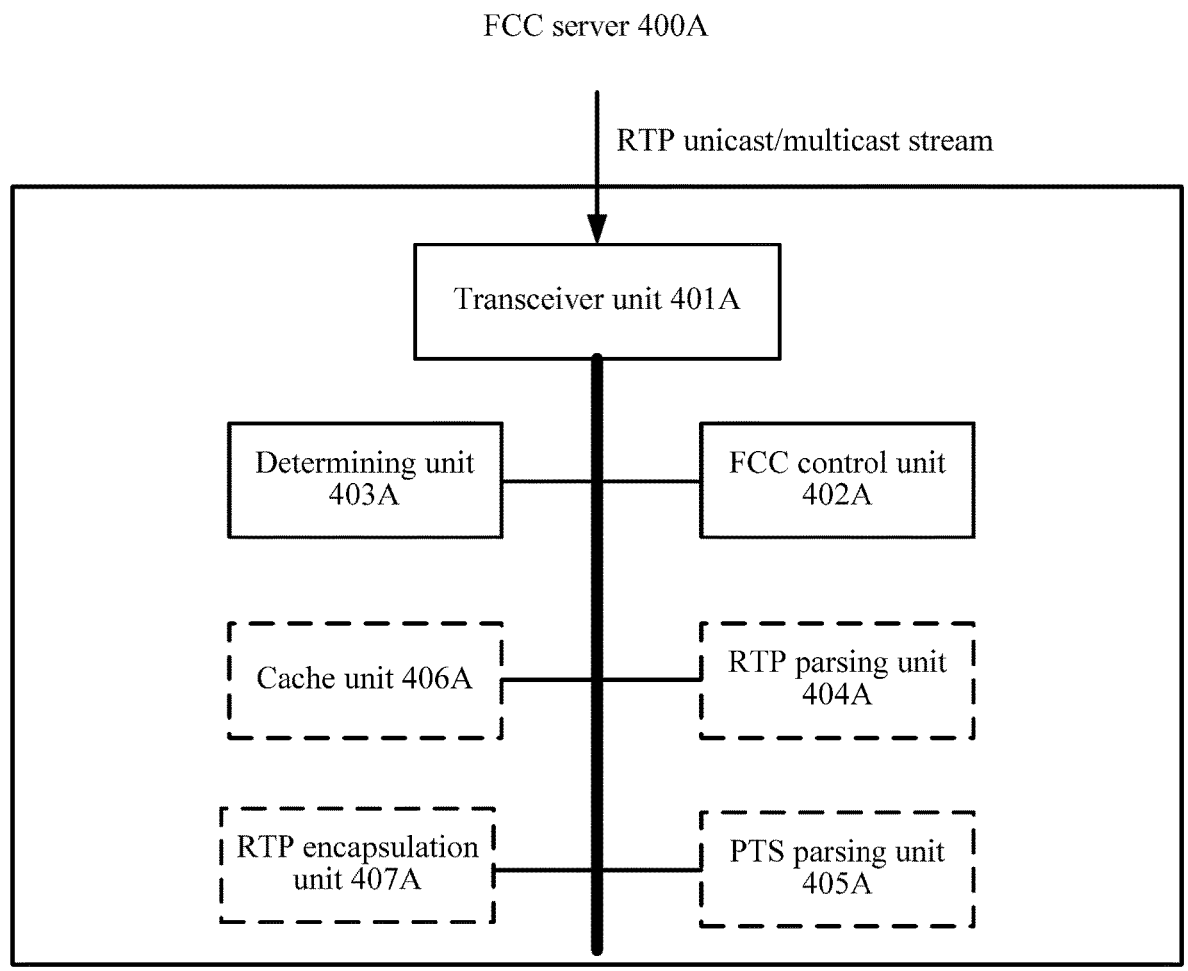
FIG. 4A is a schematic structural diagram of an FCC server according to an embodiment of the present disclosure.

The FCC server in the embodiments of the present disclosure is further described below with reference to the accompanying drawings. FIG. 4A is a schematic structural diagram of an FCC server according to an embodiment of the present disclosure. As shown in FIG. 4A, the FCC server 400A may include a transceiver unit 401A configured to receive an RTP stream of a program from an MRF system in a unicast or multicast manner, and further configured to receive a unicast request that is sent by user equipment and that includes a target channel identifier, an FCC control unit 402A configured to control, based on the unicast request of the user equipment, the transceiver unit 401A to send a unicast transport stream that is of the target channel and that starts from an I frame to the user equipment, and a determining unit 403A configured to, after the transceiver unit 401A receives a synchronization notification sent by the user equipment, and when determining, based on the synchronization notification, that a broadcast transport stream is synchronous with the unicast transport stream, control the transceiver unit 401A to stop sending the unicast transport stream of the target channel to the user equipment.

Optionally, the FCC server 400A further includes an RTP parsing unit 404A configured to parse RTP packets received from the MRF, and decompose the RTP packets into TS packets, a PTS parsing unit 405A configured to parse the TS packets decomposed from the RTP packets to obtain the PTS value of each TS packet, and a cache unit 406A configured to classify and cache the parsed TS packets and the PTS values of all the TS packets based on packet identifiers (PIDs) of the TS packets.

The determining unit 403A is further configured to obtain a PTS value of a to-be-sent TS packet in the unicast transport stream, determine, based on a PTS value that is of the first TS packet in the broadcast transport stream and that is reported by the user equipment, whether the broadcast transport stream is synchronous with the unicast transport stream, and if the broadcast transport stream is synchronous with the unicast transport stream, control the transceiver unit 401A to stop sending the unicast transport stream of the target channel to the user equipment.

Optionally, the FCC server may further include an RTP encapsulation unit 407A configured to re-encapsulate the parsed TS packets by extending a header of the RTP packet, and send the parsed TS packets on which the re-encapsulation has been performed to the user equipment. For a detailed implementation process, refer to FIG. 6A, FIG. 6B, and FIG. 7.

Figure 4B:
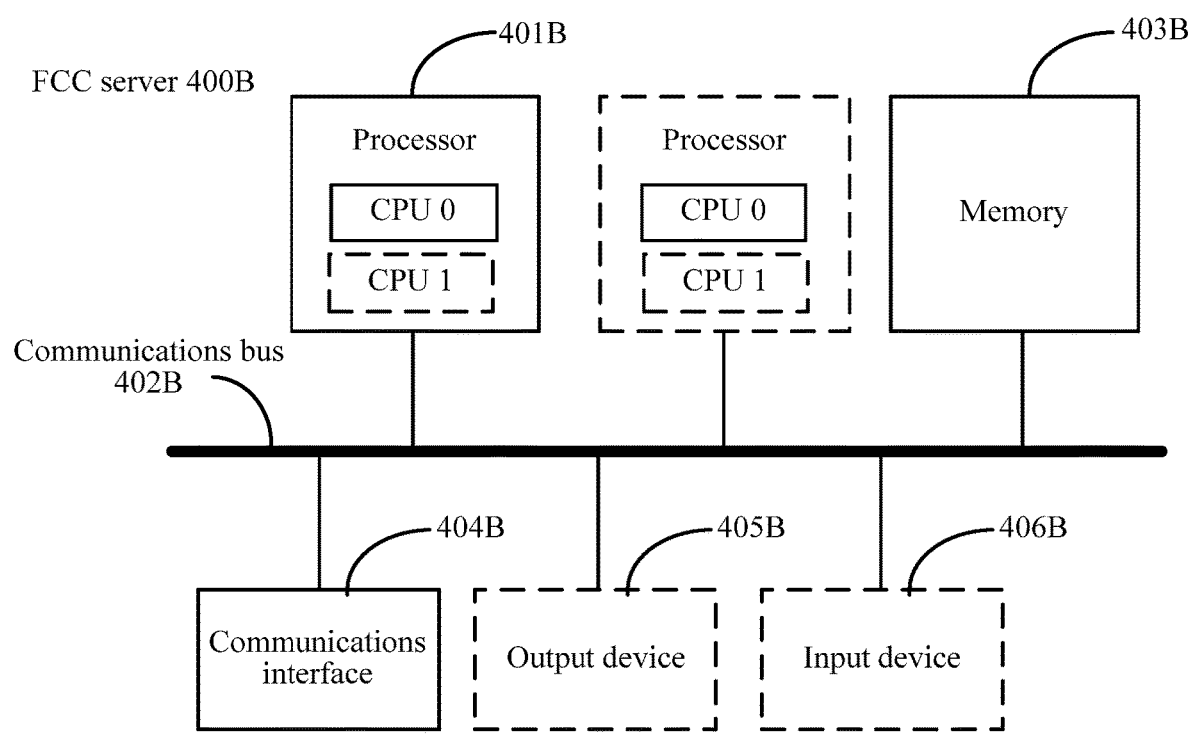
FIG. 4B is a schematic structural diagram of another FCC server according to an embodiment of the present disclosure.

The FCC server in the embodiments of the present disclosure is further described below with reference to the accompanying drawings. FIG. 4B is a schematic structural diagram of an FCC server according to an embodiment of the present disclosure. As shown in FIG. 4B, the FCC server 400B may include at least one processor 401B, a communications bus 402B, a memory 403B, and at least one communications interface 404B.

The processor 401B may be a general CPU, a microprocessor, an ASIC, or one or more integrated circuits configured to control program execution in the solution of the present disclosure.

The communications bus 402B may include a path used to transmit information between the foregoing components. The communications interface 404B is applicable to any transceiver-type apparatus, and is configured to communicate with another device or a communications network such as Ethernet, a RAN, or a WLAN.

The memory 402B may be a ROM or another type of static storage device that can store static information and a static instruction, or a RAM or another type of dynamic storage device that can store information and an instruction, or may be an EEPROM, a CD-ROM or another compact disc storage medium, optical disc storage medium (including a compact disc, a laser disc, an optical disc, a digital versatile disc, a BLU-RAY DISC, or the like) and magnetic disk storage medium, another magnetic storage device, or any other medium that can be configured to carry or store expected program code in a form of an instruction or a data structure and that is accessible to a computer, but is not limited thereto. The memory may independently exist and may be connected to the processor using the bus. Alternatively, the memory may be integrated with the processor.

The memory 403B is configured to store application program code for performing the solution of the present disclosure, and the performing is controlled by the processor 401B. The processor 401B is configured to execute the application program code stored in the memory 403B.

During specific implementation, in an embodiment, the processor 401B may include one or more CPUs, for example, a CPU 0 and a CPU 1 in FIG. 4B.

During specific implementation, in an embodiment, the FCC server 400B may include a plurality of processors, for example, a processor 401B and a processor 408B in FIG. 4B. Each of the processors may be a single-core processor or a multi-core processor. The processor herein may refer to one or more devices, circuits, and/or processing cores configured to process data (such as a computer program instruction).

During specific implementation, in an embodiment, the FCC server 400B may further include an output device 405B and an input device 406B. The output device 405B communicates with the processor 401B, and may display information in a plurality of manners. For example, the output device 405B may be an LCD, an LED display device, a CRT display device, a projector, or the like. The input device 406B communicates with the processor 401B, and may receive an input by a user in a plurality of manners. For example, the input device 406B may be a mouse, a keyboard, a touchscreen device, a sensing device, or the like.

The FCC server 400B may be a general-purpose computer device or a special-purpose computer device. During specific implementation, the FCC server 400B may be a desktop computer, a portable computer, a network server, a PDA, a mobile phone, a tablet computer, a wireless terminal device, a communications device, an embedded device, or a device having a structure similar to that in FIG. 4B. A type of the FCC server 400B is not limited in this embodiment of the present disclosure.

In a fast change method for a DVB channel in the embodiments of the present disclosure, specific operation division of the components of the FCC server may be as follows.

The communications interface 404B may be configured to receive a unicast request sent by user equipment, where the unicast request includes a target channel identifier, and may be further configured to send a unicast transport stream of the target channel to the user equipment based on the target channel identifier. Further, the communications interface 404B is further configured to receive a synchronization notification sent by the user equipment.

The processor 401B may be configured to determine, based on the synchronization notification, whether the broadcast transport stream is synchronous with the unicast transport stream, and if determining that the broadcast transport stream is synchronous with the unicast transport stream, control the communications interface 404B to stop sending the unicast transport stream of the target channel to the user equipment.

It should be noted that a specific implementation of the FCC server in the fast change method for a DVB channel in the embodiments of the present disclosure is further described below with reference to method embodiments.

The fast change method for a DVB channel in the embodiments of the present disclosure is described below in detail using an example in which user equipment is a set-top box (also referred to as STB) with reference to the accompanying drawings.

Figure 5:
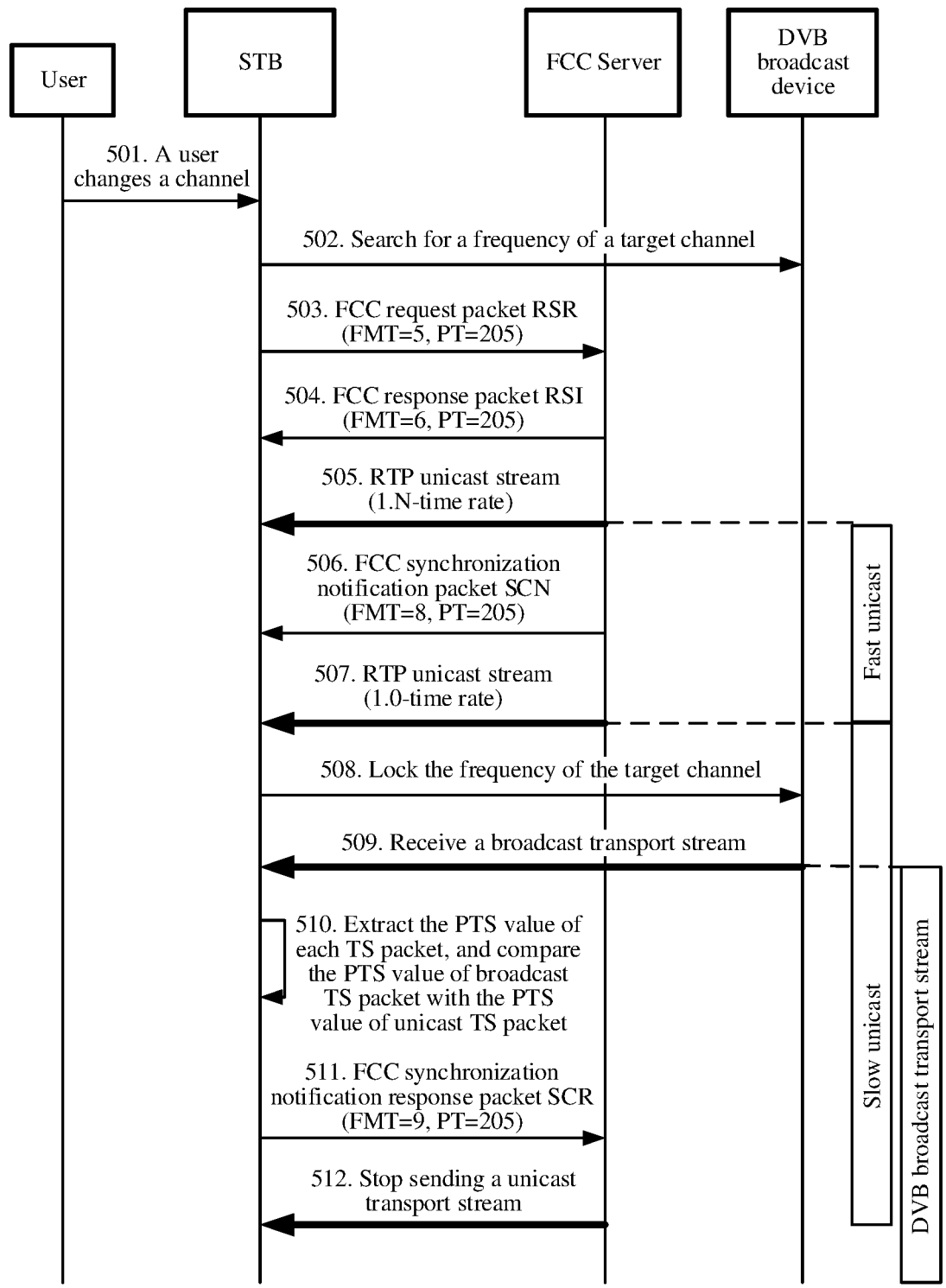
FIG. 5 is a network interaction flowchart of a fast change method for a DVB channel according to an embodiment of the present disclosure.

FIG. 5 is a network interaction flowchart of a fast change method for a DVB channel according to an embodiment of the present disclosure. As shown in FIG. 5, the method includes the following steps.

Step 501: A user initiates a channel change request to an STB using a remote control, where the channel change request includes a target channel identifier.

It should be noted that the target channel identifier may be a channel number of a target channel, or may be a signal identifier that is of a target channel and that is sent using infrared or another remote control, and the set-top box may determine a channel number of the target channel based on the signal identifier and a built-in channel list.

Step 502: The STB searches for a frequency of a target channel based on the target channel identifier.

Step 503: The STB initiates an FCC request message RSR to an FCC server in a form of an RTCP message, where the FCC request message RSR carries an IP address of the STB, an RTCP port, and the target channel identifier.

Step 504: The FCC server returns an FCC request response message RSI to the STB, where the FCC request response message RSI carries a packet sequence number of a first RTP packet in a unicast transport stream of the target channel and a channel bit rate.

Step 505: The FCC server sends the unicast transport stream, starting from an I frame in a cached TS stream of the target channel, to the STB at a 1.N-time rate, where for a specific procedure, refer to further descriptions of FIG. 6A and FIG. 6B.

Step 506: After completing sending of the cached TS stream, the FCC server sends a synchronization notification message SCN to the STB.

Step 507: Subsequently, the FCC server forwards RTP packets of the target channel that are received from a media relay function system MRF to the STB at a 1.0-time rate.

When forwarding the RTP packets of the MRF, the FCC server also needs to classify and cache TS packets based on PIDs, calculate the PTS value of each TS packet, encapsulate the RTP packets using an extension header, and send the encapsulated RTPs to the STB. An extension header of each RTP packet includes a PTS range value of a TS packet carried in the RTP packet. For a specific implementation, refer to further descriptions of FIG. 6A and FIG. 6B.

Step 508: The STB locks to the corresponding frequency of the target channel.

Step 509: Receive a broadcast transport stream from a broadcast device on a DVB side, for example, a modulation and multiplex device.

Step 510: The STB extracts and calculates a PTS value of each TS packet in the broadcast transport stream, and the STB compares whether a PTS value of a current TS packet on the DVB side falls within a PTS range value of a TS packet carried in a current RTP packet. If the PTS value falls within the range, the following steps are performed.

Step 511: Send an FCC synchronization notification response packet (SCR) to the FCC server, where a PTS value of the first TS packet received using the broadcast transport stream is stored in the packet, and the PTS value is denoted as DVB_TS_PTS.

Step 512: The FCC server continues to send the unicast transport stream to the STB, compares whether a PTS value of a currently to-be-sent TS packet is the same as DVB_TS_PTS, and if the currently to-be-sent TS packet is the same as DVB_TS_PTS, stops sending the unicast transport stream, where an insufficient part is filled using a TS null packet, and in this case, the unicast transport stream and the broadcast transport stream are seamlessly connected, the FCC server stops sending the unicast transport stream to the STB, and subsequently, the STB continues to receive the broadcast transport stream from the DVB side for decoding and playing.

In the fast change method for a DVB channel in this embodiment of the present disclosure, the FCC server is introduced into an existing DVB system architecture, and the unicast transport stream starting from the I frame is fast sent to a user equipment in a manner of unicast of the FCC server assisting broadcast. In this way, it is ensured that the user equipment fast displays an image, channel change time is reduced, a channel change speed is increased, and user experience is improved.

Figure 6A:
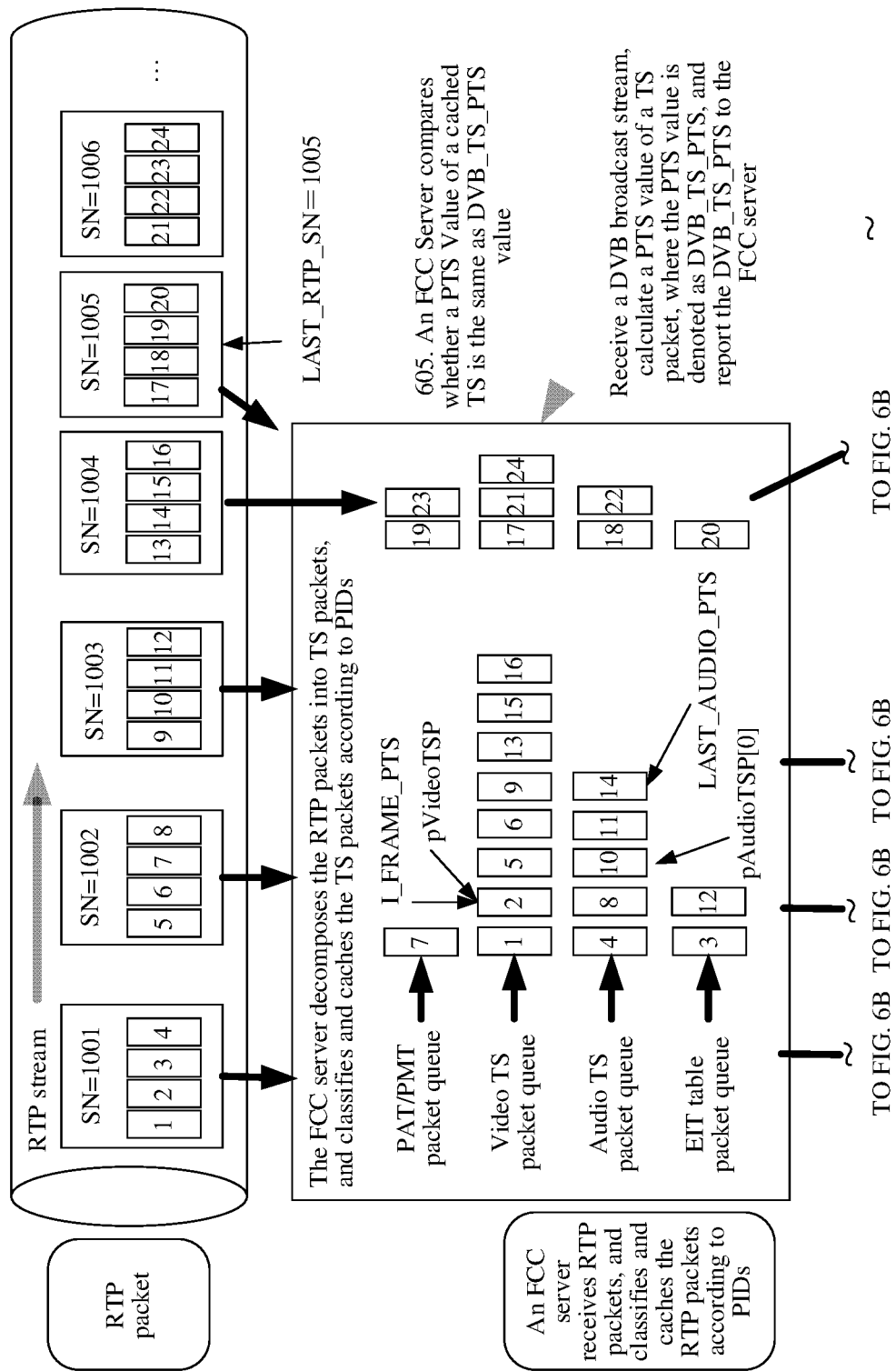
FIG. 6A and FIG. 6B are a schematic diagram of a method for sending a stream by an FCC server in an FCC process according to an embodiment of the present disclosure.
Figure 6B:
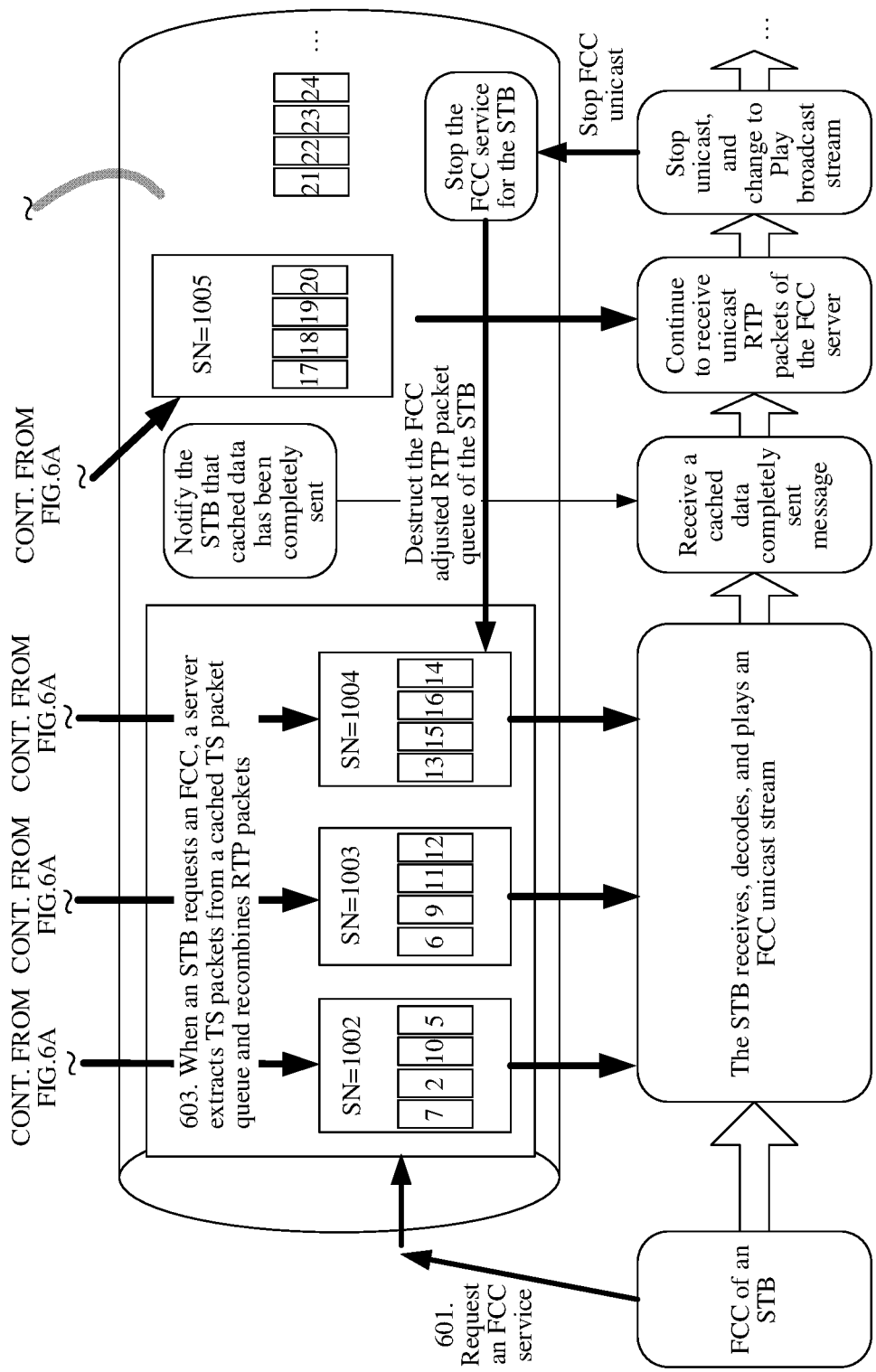

FIG. 6A and FIG. 6B are a schematic diagram of a method for sending a stream to user equipment by an FCC server in an FCC process according to an embodiment of the present disclosure. As is shown in FIG. 6A and FIG. 6B.

Before the FCC server sends a unicast transport stream of a target channel to an STB, the FCC server first needs to parse RTP packets that are of the target channel and that are received from a media relay function system into TS packets, and re-encapsulates the TS packets into RTP packets. When re-encapsulating the TS packets into the RTP packets, the FCC server needs to extend a header of the RTP packet, as shown in FIG. 8.

X=1, which indicates that the header of the RTP packet is extended. An extension header is shown in FIG. 9.

TAG=1000, which indicates a PTS range value of a TS packet included in a current RTP packet. PTS1-Low is 0 to 31 bits of a PTS value of the first TS packet in the RTP packet. PTS1-High is 32 to 63 bits of the PTS value of the first TS packet in the RTP packet. PTS2-Low is 0 to 31 bits of a PTS value of a last TS packet in the RTP packet. PTS1-High is 32 to 63 bits of the PTS value of the last TS packet in the RTP packet.

A specific re-encapsulation process is as follows.

After receiving RTP packets sent by the media relay function system, the FCC server decomposes the RTP packets into TS packets, and classifies and caches the TS packets based on PIDs of all the TS packets, and further needs to respectively calculate a PTS corresponding to each TS packet in the RTP packets, insert the PTS into a TS packet queue of a corresponding PID, and record a sequence number LAST_RTP_SN of a last RTP packet, for example, LAST_RTP_SN=1005.

Figure 7:
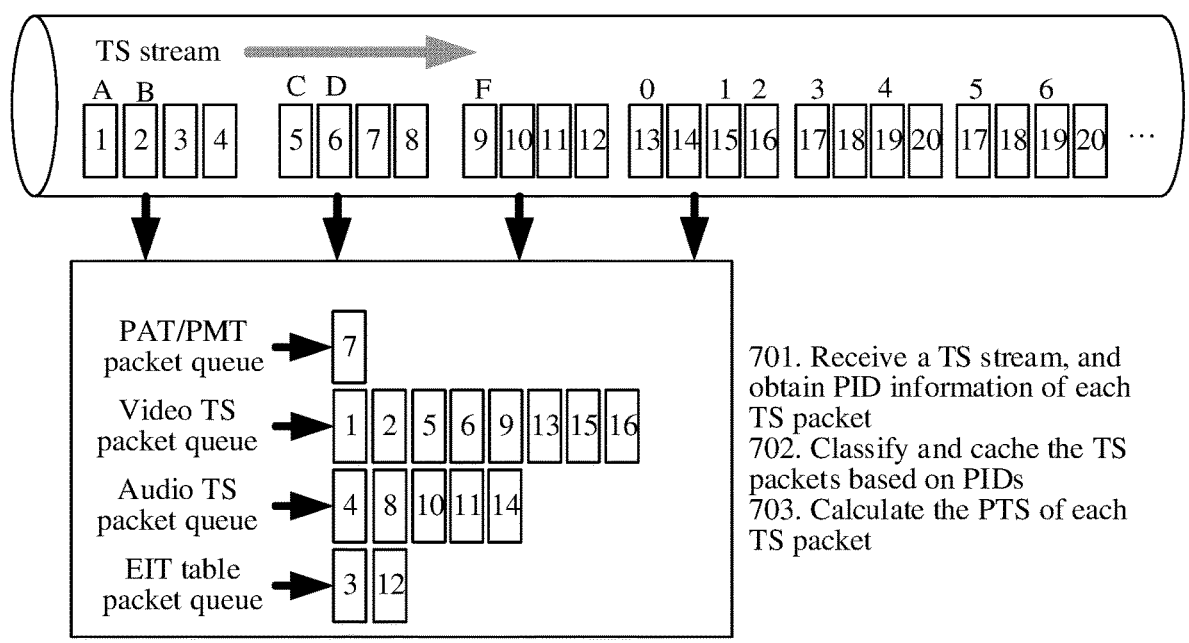
FIG. 7 is a schematic diagram of a PTS calculation method in an FCC process according to an embodiment of the present disclosure.

For a specific PTS calculation process, refer to descriptions in FIG. 7.

It should be noted that the PID is used to indicate a data type, for example, a video packet or an audio packet, that is stored in packet payload data.

The following steps are specific steps of sending a unicast transport stream to the STB by the FCC server.

Step 601: The FCC server receives an FCC service request message sent by the STB, where the request message carries a target channel identifier.

Step 602: The FCC server searches a video cache queue for a closest I frame of a target channel, where a specific implementation process is as follows.

Step 6021: The FCC server calculates a largest PTS value in all audio tracks in a current PID queue, where the PTS value is denoted as LAST_AUDIO_PTS.

Step 6022: The FCC server searches the video cache queue for a first I frame whose PTS value is less than LAST_AUDIO_PTS, where the PTS of the first I frame is denoted as I_FRAME_PTS, and points, using a pointer pVideoTSP, to a TS packet in which the I frame is located.

Step 6023: The FCC server searches, based on I_FRAME_PTS, a TS packet queue of an audio track i for a TS packet having a closest PTS, and points to the TS packet using a pointer pAudioTSP[i].

Step 6024: The FCC server calculates a quantity of TS packets in an audio/video TS packet queue that follow the pointers pVideoTSP and pAudioTSP[i], where the quantity is denoted as TOTAL_ES_TSP_COUNT.

Step 603: The FCC server encapsulates cached TS packets using extended RTP packets, and sends the RTP packets to the STB at a 1.N-time rate, where a specific implementation is as follows.

Step 6031: The FCC server calculates a quantity of RTP packets required for carrying a currently to-be-transmitted audio/video TS packet (two TS packets including a PAT/PMT):

RTP_COUNT=ceil((TOTAL_ES_TSP_COUNT+2)/ TSPS_PER_RTP_PACKET).

Step 6032: The FCC server calculates a packet sequence number of a first RTP packet:

CURRENT_RTP_SN=LAST_RTP_SN−RTP_COUNT+1.

Step 6033: The FCC server obtains the TS packets including the PAT/PMT, extracts five TS packets from the audio/video TS packet queue, to form an RTP packet using seven TS packets in total, where a packet sequence number is CURRENT_RTP_SN, and after sending the RTP packet to the set-top box, adds the RTP packet into an RTP queue that is already sent (for retransmission).

Step 6034: The FCC server calculates a packet sequence number of a current RTP packet:

CURRENT_RTP_SN++.

6035: Circulate the steps until audio/video TS packet queues are all null:

(a) Extracting, by the FCC server, seven TS packets from an audio/video TS packet to form an RTP packet (if there is no sufficient seven TS packets, a null TS packet may be used for filling), where a packet sequence number of the RTP packet is CURRENT_RTP_SN;

(b) Sending, by the FCC the server, the newly generated RTP packet to the set-top box;

(c) Adding, by the FCC server, the newly generated RTP packet into a list of an already transmitted RTP packet (for transmission); and (d) Calculating, by the FCC server, a packet sequence number of a current RTP packet: CURRENT_RTP_SN++.

Step 6036: Circulate the steps until CURRENT_RTP_SN=LAST_RTP_SN:

(a) Generating seven TS null packets to form an RTP packet, where a packet sequence number of the RTP packet is CURRENT_RTP_SN;

(b) Sending, by the FCC the server, the newly generated RTP packet to the set-top box; and (c) Adding, by the FCC server, the newly generated RTP packet into a list of an already transmitted RTP packet (for transmission):

(d) CURRENT_RTP_SN++.

Step 604: After completing transmission of a TS stream in a buffer, the FCC server processes received RTP packets at a 1.0-time rate and forwards the RTP packets to the set-top box.

Step 605: The FCC server determines, using PTS values, whether a local TS stream is synchronous with a TS stream on a DVB side, and after the local TS stream is synchronous with the TS stream on the DVB side, the FCC server stops sending the unicast stream to the STB, where for a specific manner, refer to the descriptions of step 507 and step 508 in FIG. 5.

It should be noted that some steps, for example, step 602 and step 604, in the foregoing descriptions of the process of sending a stream to the set-top box by the FCC server are not illustrated in FIG. 6A and FIG. 6B.

PTS extraction and calculation methods are further described below. FIG. 7 is a schematic diagram of a PTS calculation method in an FCC process according to an embodiment of the present disclosure. The method includes the following steps.

Step 701: Obtain PID information of each TS packet.

Further, a PID of a PAT packet is fixed to 0. Therefore, the PAT packet can be first obtained accordingly. Then, PID information of a PMT can be obtained based on the PAT, and then a video PID and a PID of an EIT can be identified based on the PAT/PMT packet.

A plurality of concepts related to this step is are described below.

Program Association Table (PAT): A decoding operation always starts from search of a PAT table. The PAT provides a PID of a Program Map Table (PMT) forming each program service in a transport stream, and also provides a PID number of a Network Information Table (NIT). A receive end can obtain all PMT tables based on listed PIDs.

PMT: The PMT table indicates a PID number of each bit stream forming a program service and describes each bit stream. The PMT describes a PID of a video/audio PES stream of a program in a current TS stream, and a quantity of PMTs is equal to a quantity of programs in the current TS stream. An elementary stream of a specified program can be extracted from a transport stream using the PMT and decoding and replay can be performed on the elementary stream.

EIT (Event Information Table), which provides, in a chronological order, information of a program segmentation included in each program service, and provides a name, start time, a time length, an operating status, and the like of an event.

PID: Has a unique integer value and can identity a unit, for example, a table, data, or audio of a program, that is in a transport bit stream.

Step 702: Classify and cache TS packets based on PIDs.

Further, TS packets identified by different PIDs are classified and cached into different packet queues based on the PIDs of the TS packets, for example, a video TS packet queue, an audio TS packet queue, and a PAT/PMT packet queue.

Step 703: Calculate a PTS of each TS packet, where a specific implementation process is as follows.

Step 7031: Obtain a TS packet in which a title of a PES packet is located.

Further, for a corresponding video TS packet, if a value of a field pay_load_unix_start_indicator of the video TS packet is 1, and previous 24 bits of TS load is 0x000001, it indicates that the TS packet carries the title of the PES packet, and the TS packet is obtained.

Step 7032: Extract a PTS value of the TS packet.

If PTS_DTS_Flags of the title of the PES packet is 10 or 11, PTS information is extracted, as shown in FIG. 10.

Step 7033: Calculate, based on the PTS value corresponding to the TS packet, a PTS value of each subsequent TS packet.

PTS values of all TS packets between two PES packets are the same. Therefore, PTS values of TS packets between the PES packet and a next PES packet are all denoted, based on a PTS of the PES packet, as the PTS value of the PES packet.

Step 7034: When load of a TS packet includes a title of a PES packet again, re-extract a PTS value carried in the TS packet in which the title of the PES packet is located as a basis for PTS calculation of a subsequent TS packet.

It should be noted that the method is applicable to both PTS extraction and calculation by an FCC server and PTS extraction and calculation by a user equipment.

A person of ordinary skill in the art may be aware that, the units and algorithm steps in the examples described with reference to the embodiments disclosed herein may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A fast change method for a digital video broadcasting (DVB) channel performed by a user equipment, comprising:
receiving a channel change request from a user, the channel change request comprising a target channel identifier;
determining a frequency corresponding to a broadcast transport stream of a target channel from a DVB network side based on the target channel identifier;
sending a unicast request to a fast channel change (FCC) server based on the channel change request, the unicast request comprising the target channel identifier;
receiving a unicast transport stream of the target channel from the FCC server;
subsequent to receiving the channel change request, locking to the frequency corresponding to the broadcast transport stream of the target channel;
receiving, from the DVB network side based on the frequency corresponding to the broadcast transport stream of the target channel, the broadcast transport stream of the target channel; and
subsequent to locking to the frequency of the target channel, sending a synchronization notification to the FCC server to instruct the FCC server to stop sending the unicast transport stream of the target channel when the broadcast transport stream is synchronous with the unicast transport stream.

2. The fast change method of claim 1, further comprising:
parsing the broadcast transport stream of the target channel; and
determining a presentation time stamp (PTS) value of each transport stream (TS) packet in the broadcast transport stream.

3. The fast change method of claim 2, wherein the unicast transport stream comprises Real-time Transport Protocol (RTP) packets, and wherein the fast change method further comprises:
parsing the RTP packets; and
obtaining PTS range values of TS packets carried in the RTP packets.

4. The fast change method of claim 3, wherein determining that the broadcast transport stream is synchronous with the unicast transport stream comprises:
determining whether a PTS value of a currently received TS packet in the broadcast transport stream falls within a PTS range value of a currently received RTP packet in the unicast transport stream; and
determining that the broadcast transport stream is synchronous with the unicast transport stream when the PTS value of the currently received TS packet in the broadcast transport stream falls within the PTS range value of the currently received RTP packet in the unicast transport stream.

5. The fast change method of claim 2, wherein the synchronization notification carries a PTS value of a first TS packet in the broadcast transport stream.

6. The fast change method of claim 1, wherein the user equipment locks to the frequency corresponding to the broadcast transport stream of the target channel while the user equipment receives the unicast transport stream of the target channel from the FCC server.

7. A fast change method for a digital video broadcasting (DVB) channel, comprising:
receiving a unicast request from a user equipment, the unicast request comprising a target channel identifier;
sending a unicast transport stream of a target channel to the user equipment based on the target channel identifier;
receiving a synchronization notification from the user equipment; and
determining, based on the synchronization notification, that a broadcast transport stream is synchronous with the unicast transport stream by:
obtaining a PTS value of a to-be-sent TS packet in the unicast transport stream;
comparing whether the PTS value of the to-be-sent TS packet is the same as a PTS value of a first TS packet in the broadcast transport stream; and
determining that the broadcast transport stream is synchronous with the unicast transport stream when the PTS value of the to-be-sent TS packet is the same as the PTS value of the first TS packet in the broadcast transport stream; and
stopping sending the unicast transport stream of the target channel to the user equipment when the broadcast transport stream is synchronous with the unicast transport stream.

8. The fast change method of claim 7, wherein the synchronization notification carries the PTS value of the first TS packet in the broadcast transport stream.

9. The fast change method of claim 7, wherein the fast change method is implemented by a fast channel change (FCC) server.

10. The fast change method of claim 7, wherein the unicast transport stream comprises Real-time Transport Protocol (RTP) packets, and wherein each RTP packet of the RTP packets carries a presentation time stamp (PTS) range value of a transport stream (TS) packet carried in the RTP packet.

11. A user equipment, comprising:
a communications interface configured to receive a channel change request from a user, the channel change request comprising a target channel identifier; and
a processor coupled to the communications interface and configured to:
determine a frequency corresponding to a broadcast transport stream of a target channel from a digital video broadcasting (DVB) network side based on the target channel identifier; and
subsequent to receiving the channel change request, lock to the frequency corresponding to the broadcast transport stream of the target channel,
wherein the communications interface is further configured to:
send a unicast request to a fast channel change (FCC) server based on the channel change request, wherein the unicast request comprises the target channel identifier;
receive a unicast transport stream of the target channel from the FCC server;
receive, based on the frequency of the target channel, the broadcast transport stream of the target channel from the DVB network side; and
subsequent to locking to the frequency corresponding to the broadcast transport stream of the target channel, send a synchronization notification to the FCC server to instruct the FCC server to stop sending the unicast transport stream of the target channel when the processor determines that the broadcast transport stream is synchronous with the unicast transport stream.

12. The user equipment of claim 11, wherein the processor is further configured to:
parse the broadcast transport stream of the target channel; and
determine a presentation time stamp (PTS) value of each transport stream (TS) packet in the broadcast transport stream.

13. The user equipment of claim 12, wherein the unicast transport stream comprises Real-time Transport Protocol (RTP) packets, and wherein the processor is configured to:
parse the RTP packets; and
obtain PTS range values of TS packets carried in the RTP packets.

14. The user equipment of claim 13, wherein the processor is further configured to:
determine whether a PTS value of a currently received TS packet in the broadcast transport stream falls within a PTS range value of a currently received RTP packet in the unicast transport stream; and
determine that the broadcast transport stream is synchronous with the unicast transport stream when the PTS value of the currently received TS packet in the broadcast transport stream falls within the PTS range value of the currently received RTP packet in the unicast transport stream.

15. The user equipment of claim 11, wherein the processor locks to the frequency corresponding to the broadcast transport stream of the target channel while the user equipment receives the unicast transport stream of the target channel from the FCC server.

16. A user equipment, comprising:
a transceiver configured to receive a channel change request from a user, the channel change request comprising a target channel identifier; and
a processor coupled to the transceiver and configured to:
determine a frequency corresponding to a broadcast transport stream of a target channel from a digital video broadcasting (DVB) network side based on the target channel identifier;
subsequent to receiving the channel change request, lock the frequency of the target channel;
control the transceiver to receive the broadcast transport stream of the target channel from the digital video broadcasting (DVB) network side;
send, using the transceiver, a unicast request to a fast channel change (FCC) server based on the channel change request, the unicast request comprising the target channel identifier;
control, the transceiver to receive a unicast transport stream of the target channel from the FCC server; and
subsequent to locking to the frequency corresponding to the broadcast transport stream of the target channel, control the transceiver to send a synchronization notification to the FCC server to instruct the FCC server to stop sending the unicast transport stream of the target channel when the broadcast transport stream is synchronous with the unicast transport stream.

17. The user equipment of claim 16, wherein the processor is further configured to:
parse the broadcast transport stream of the target channel; and
determine a presentation time stamp (PTS) value of each transport stream (TS) packet in the broadcast transport stream.

18. The user equipment of claim 17, wherein the unicast transport stream comprises Real-time Transport Protocol (RTP) packets, and wherein the processor is configured to:
parse the RTP packets; and
obtain PTS range values of TS packets carried in the RTP packets.

19. The user equipment of claim 18, wherein the processor is further configured to:
determine whether a PTS value of a currently received TS packet in the broadcast transport stream falls within a PTS range value of a currently received RTP packet in the unicast transport stream; and
determine that the broadcast transport stream is synchronous with the unicast transport stream when the PTS value of the currently received TS packet in the broadcast transport stream falls within the PTS range value of the currently received RTP packet in the unicast transport stream.

20. The user equipment of claim 16, wherein the processor locks to the frequency corresponding to the broadcast transport stream of the target channel while the user equipment receives the unicast transport stream of the target channel from the FCC server.

* * * * *